US011639096B2

(12) United States Patent
Yamada et al.

(10) Patent No.: US 11,639,096 B2
(45) Date of Patent: May 2, 2023

(54) SUSPENSION APPARATUS AND VEHICLE

(71) Applicant: TOYOTA JIDOSHA KABUSHIKI KAISHA, Toyota (JP)

(72) Inventors: Masahiko Yamada, Okazaki (JP); Satoshi Adachi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 796 days.

(21) Appl. No.: 16/655,966

(22) Filed: Oct. 17, 2019

(65) Prior Publication Data

US 2020/0122565 A1    Apr. 23, 2020

(30) Foreign Application Priority Data

Oct. 23, 2018    (JP) .............................. JP2018-199521

(51) Int. Cl.
B60K 7/00    (2006.01)
B60G 3/14    (2006.01)
(Continued)

(52) U.S. Cl.
CPC .............. B60K 7/0007 (2013.01); B60G 3/14 (2013.01); B60G 3/18 (2013.01); B60G 7/00 (2013.01);
(Continued)

(58) Field of Classification Search
CPC .......... B60K 7/0007; B60K 2007/0092; B60K 2007/0038; B60K 2007/0061; B60G 3/14;
(Continued)

(56) References Cited

U.S. PATENT DOCUMENTS 4,758,018 A * 7/1988 Takizawa ................. B60G 7/00
280/124.109
4,840,396 A    6/1989 Kubo
(Continued)

FOREIGN PATENT DOCUMENTS

DE    4120894 A1 * 1/1993 ............. B60G 3/26
DE    10005472 A1 * 8/2001 ............. B60G 15/07
(Continued)

OTHER PUBLICATIONS

Hishinuma Takuya, 'Machine Translation of JP 2007307968 A Obtained Jul. 22, 2022', Nov. 29, 2007, Entire Document. (Year: 2007).*

(Continued)

*Primary Examiner* — James A English
*Assistant Examiner* — Scott F. Underwood
(74) *Attorney, Agent, or Firm* — Sughrue Mion, PLLC

(57) ABSTRACT

A suspension apparatus configured to support a wheel of a vehicle includes an in-wheel motor. The suspension apparatus includes a suspension member extending substantially in a front and rear direction of the vehicle and coupled to a carrier at a plurality of coupling portions spaced apart from each other in an up and down direction. The carrier holds the in-wheel motor. A reference point of an upper one of the plurality of coupling portions is located on an inner side of a reference point of a lower one of the plurality of coupling portions in a widthwise direction of the vehicle.

8 Claims, 6 Drawing Sheets

(51) Int. Cl.
  *B60G 3/18* (2006.01)
  *B60G 7/00* (2006.01)

(52) U.S. Cl.
  CPC .. *B60G 2200/132* (2013.01); *B60G 2200/422* (2013.01); *B60K 2007/0092* (2013.01)

(58) Field of Classification Search
  CPC ... B60G 3/20; B60G 3/18; B60G 7/00; B60G 7/001; B60G 7/008; B60G 2200/132; B60G 2200/18; B60G 2200/422; B60G 2204/182; B60G 2300/50
  See application file for complete search history.

(56) References Cited

U.S. PATENT DOCUMENTS

| | | | |
|---|---|---|---|
| 10,471,791 B2* | 11/2019 | Yanagida | B60G 7/001 |
| 2011/0132673 A1* | 6/2011 | Kim | B60G 21/051 |
| | | | 180/61 |
| 2014/0054871 A1* | 2/2014 | Jakob | B60G 7/006 |
| | | | 280/124.134 |
| 2015/0061250 A1 | 3/2015 | Yamada et al. | |
| 2015/0203159 A1* | 7/2015 | Tamura | B62D 21/11 |
| | | | 180/55 |
| 2015/0210154 A1* | 7/2015 | Tamura | B60K 7/0007 |
| | | | 180/55 |
| 2018/0334002 A1* | 11/2018 | Kato | B62K 25/20 |

FOREIGN PATENT DOCUMENTS

| | | | | |
|---|---|---|---|---|
| EP | 0691225 A1 | * | 1/1996 | |
| EP | 1479541 A1 | * | 11/2004 | ............... B60G 3/20 |
| JP | 63-145112 A | | 6/1988 | |
| JP | 02-037005 A | | 2/1990 | |
| JP | 2007-099015 A | | 4/2007 | |
| JP | 2007-307968 A | | 11/2007 | |
| JP | 2008018924 A | * | 1/2008 | |
| JP | 2012-201343 A | | 10/2012 | |
| JP | 2015-020670 A | | 2/2015 | |
| JP | 2015-047909 A | | 3/2015 | |
| JP | 2015-113012 A | | 6/2015 | |

OTHER PUBLICATIONS

Komatsu Hajime. 'Machine Translation of JP 2015020670 A Obtained Jul. 22, 2022', Feb. 2, 2015, Entire Document. (Year: 2015).*
Yoshida Hiroshi, 'Machine Translation of JP 2012201343 A Obtained Jul. 22, 2022', Oct. 22, 2012, Entire Document. (Year: 2012).*
Winter Ingo Dipl-Ing, 'Machine Translation of EP 0691225 A1 Obtained Jul. 22, 2022', Jan. 10, 1996, Entire Document. (Year: 1996).*

* cited by examiner

FIG.1A  OUTER SIDE ⟵⟶ INNER SIDE
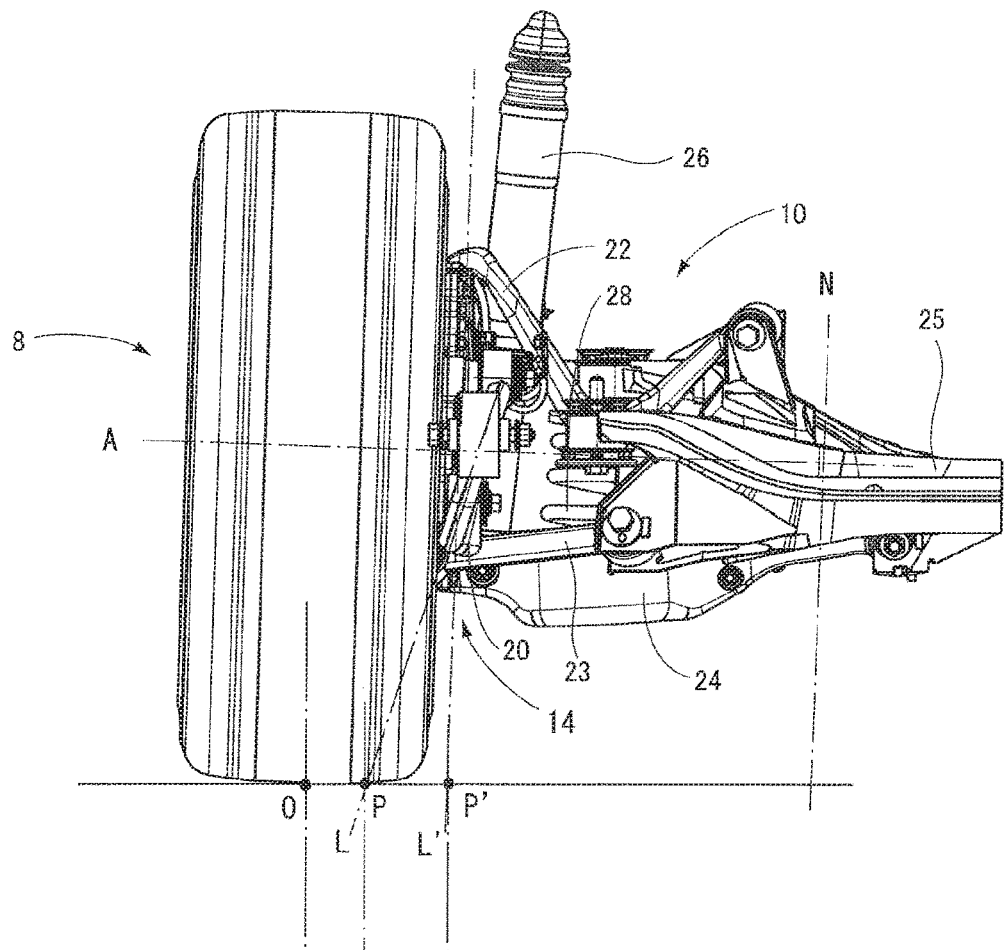
FIG.1B
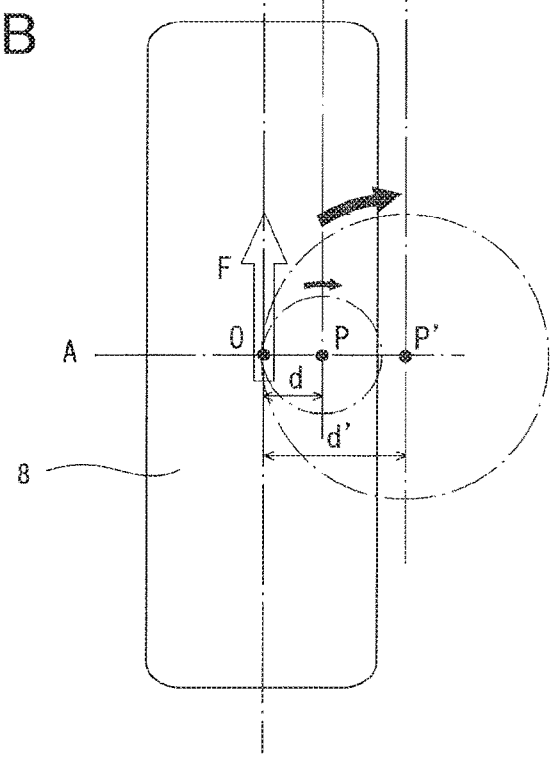

SUSPENSION APPARATUS AND VEHICLE

CROSS REFERENCE TO RELATED APPLICATION

The present application claims priority from Japanese Patent Application No. 2018-199521, which was filed on Oct. 23, 2018, the disclosure of which is herein incorporated by reference in its entirety.

BACKGROUND

The following disclosure relates to a suspension apparatus configured to support a wheel including an in-wheel motor, and to a vehicle including the suspension apparatus.

Patent Document 1 (Japanese Patent Application Publication No. 2015-113012) discloses a suspension apparatus configured to support a wheel including an in-wheel motor. In this suspension apparatus, a trailing arm as a suspension member extending in the front and rear direction of a vehicle is provided integrally with a carrier holding the in-wheel motor.

SUMMARY

Accordingly, an aspect of the disclosure relates to improvement of a suspension apparatus configured to support a wheel including an in-wheel motor and, for example, to reduction of a moment generated due to an output of the in-wheel motor.

In one aspect of the disclosure, a suspension apparatus includes a suspension member extending in a front and rear direction of a vehicle. This suspension member is coupled to a carrier at a plurality of coupling portions. The carrier holds an in-wheel motor. An upper one of the plurality of coupling portions is located on an inner side of a lower one of the plurality of coupling portions in a widthwise direction of the vehicle. Thus, a point of intersection between a road surface and a straight line extending through the plurality of coupling portions can be brought closer to a center point of a surface on which the wheel and the road surface are in contact with each other, than the point of intersection in the case where the plurality of coupling portions are located at the same position in the widthwise direction of the vehicle.

In the wheel including the in-wheel motor, an output of the in-wheel motor (a driving force and a regenerative braking force thereof) is applied to a center point of a surface of the wheel which is in contact with the road surface. Thus, by bringing the point of intersection between the road surface and the straight line extending through the plurality of coupling portions, closer to the center point of the surface on which the wheel and the road surface are in contact with each other, it is possible to reduce a moment generated about the point of intersection due to an output of the in-wheel motor. It is noted that Patent Document 1 does not disclose a relative positional relationship between the suspension member and the carrier.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 1A is a front elevational view of a vehicle including a suspension apparatus according to a first embodiment;

FIG. 1B is a plan view of a wheel of the vehicle;

EMBODIMENT

Hereinafter, there will be described a vehicle including a suspension apparatus according to one embodiment.

First Embodiment

Figure 2:
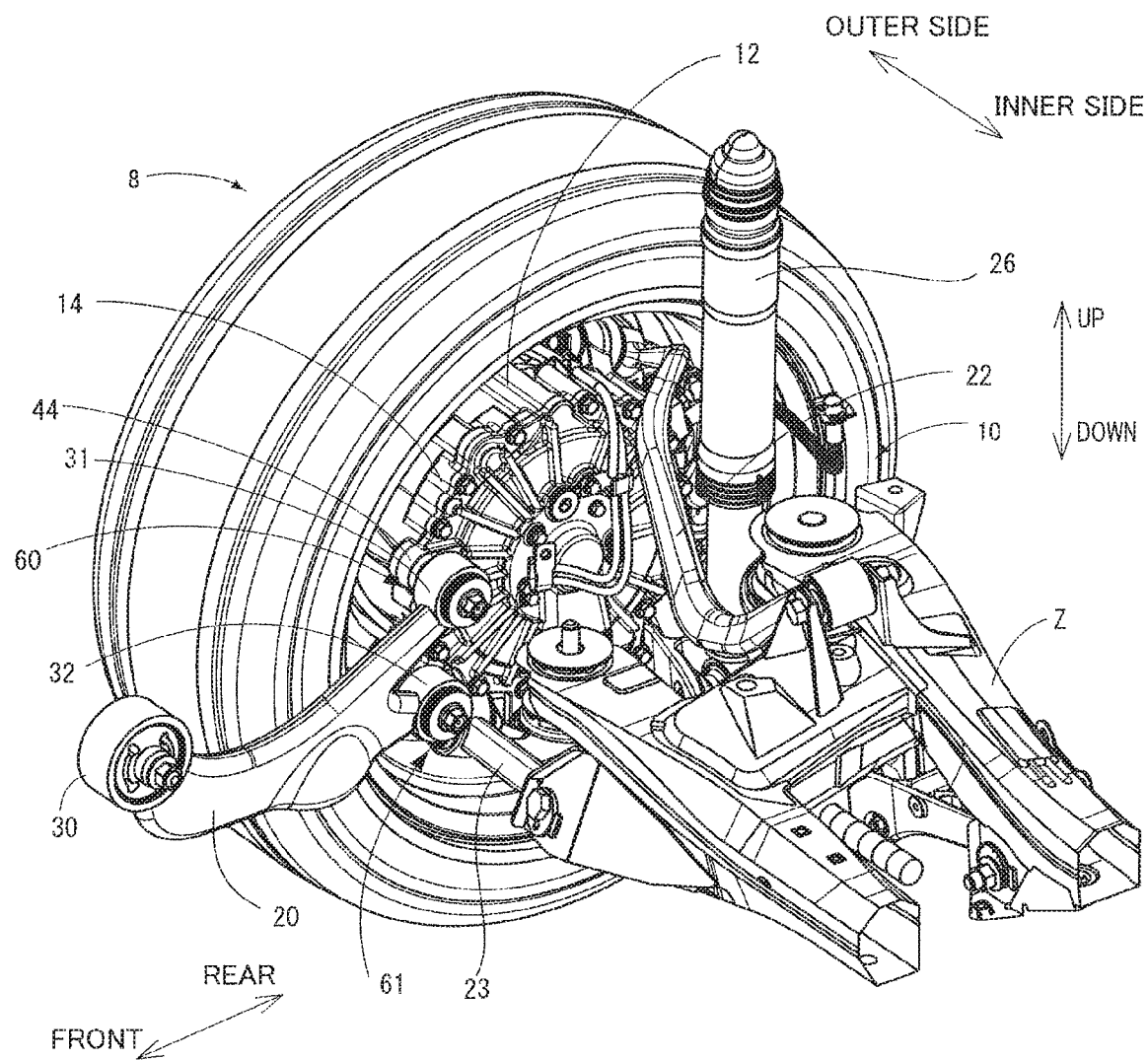
FIG. 2 is a perspective view of the vehicle.
Figure 3:
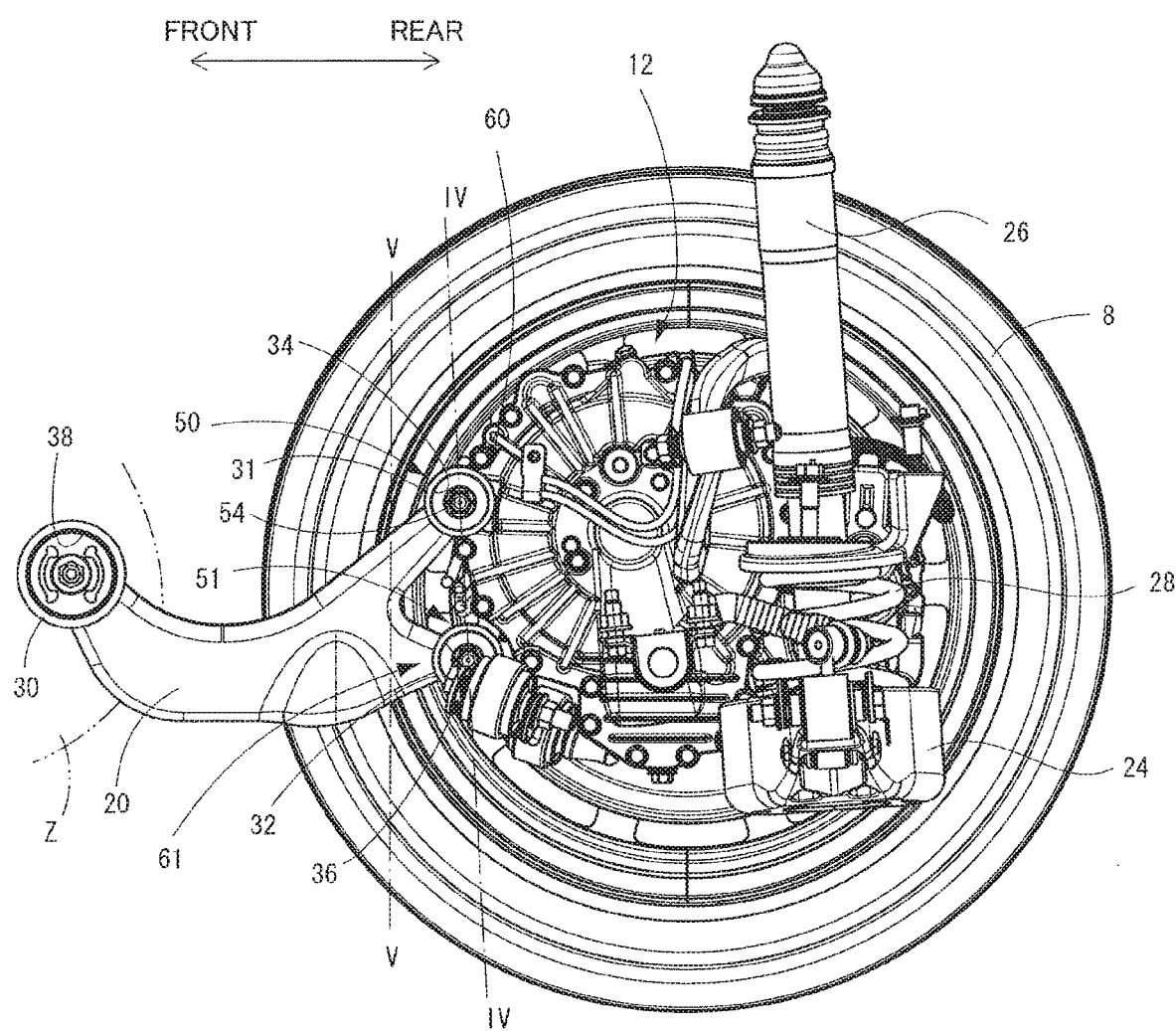
FIG. 3 is a side view of the vehicle.

As illustrated in FIGS. 1-3, the present vehicle includes: a rear wheel 8 that is one of wheels provided for the vehicle; and a suspension apparatus 10 that supports the rear wheel 8. The rear wheel 8 is a drive wheel provided with an in-wheel motor 12 that is an electric motor for driving the rear wheel 8. The in-wheel motor 12 may be a motor with a speed reducer. The output of the in-wheel motor 12 is applied to a center point O of a surface of the rear wheel 8 which is in contact with a road surface. The center point may be hereinafter referred to as "contact center point". The in-wheel motor 12 is held by a carrier 14 which may be referred to as "axle carrier 14". The carrier 14 in some cases includes a housing of the in-wheel motor 12.

The suspension apparatus 10 is of what is call a trailing multi-link type and includes a plurality of suspension members 20, 22-24 coupled to the carrier 14. The suspension members 20, 22-24 include: a first suspension member 20 extending in the front and rear direction of the vehicle; and second suspension members 22, 23, 24 each extending in the widthwise direction of the vehicle.

Thus, only the first suspension member 20 extends in the front and rear direction of the vehicle among the suspension members 20, 22-24 of the suspension apparatus 10. Accordingly, a force applied to the rear wheel 8 in the front and rear direction is received not by the second suspension members 22, 23, 24 but by the first suspension member 20.

One end portion of each of the second suspension members 22, 23, 24 is coupled to the carrier 14 so as to be movable in the up and down direction. The other end portion of each of the second suspension members 22, 23, 24 is coupled to a vehicle-body-side component Z so as to be movable in the up and down direction. The second suspension member 24 holds a shock absorber 26 and a spring 28.

As illustrated in FIG. 3, a trailing arm 20 as a first suspension member has a substantially A shape and has a top portion 30 with one through hole 38 formed therein. The trailing arm 20 is separated into two branch portions, and through holes 34, 36 are formed in end portions 31, 32 of the respective branch portions. In the present embodiment, the end portions 31, 32 (having the through holes 34, 36) of the respective branch portions of the trailing arm 20 are one end portion of the trailing arm 20, and the top portion 30 (having the through hole 38) is the other end portion of the trailing arm 20. The one end portions 31, 32 of the trailing arm 20 are coupled to the carrier 14, and the other end portion 30 of the trailing arm 20 is coupled to the vehicle-body-side component Z.

Figure 5:
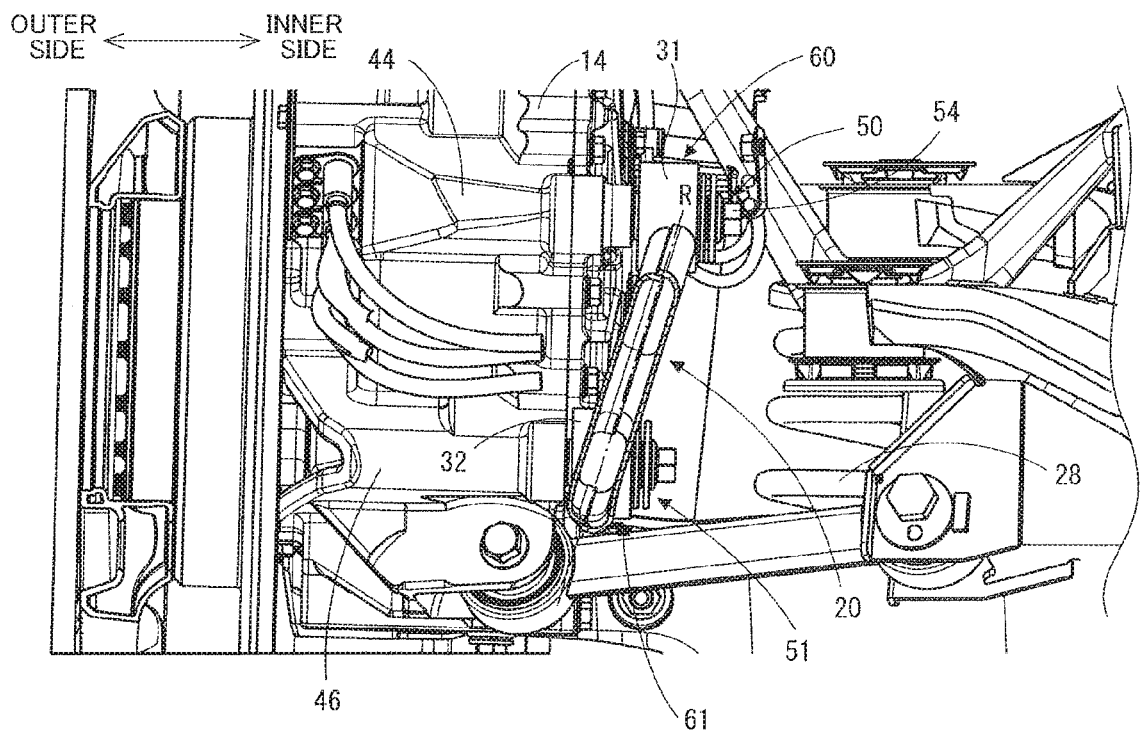
FIG. 5 is a partial cross-sectional view taken along line V-V in FIG. 3.

As illustrated in FIG. 5, the cross section of a portion of the trailing arm 20 which is located near the one end portions 31, 32, which cross section is parallel with a rotation center axis A of an output shaft of the in-wheel motor 12 (see FIG. 1) has a shape that extends in the longitudinal direction of the cross section and that is substantially symmetric with respect to the axis R extending in the longitudinal direction. Thus, it is possible to consider that the axis R is a principal axis R of the cross section of the trailing arm 20 (which may be referred to as "support-stiffness principal axis").

Figure 4:
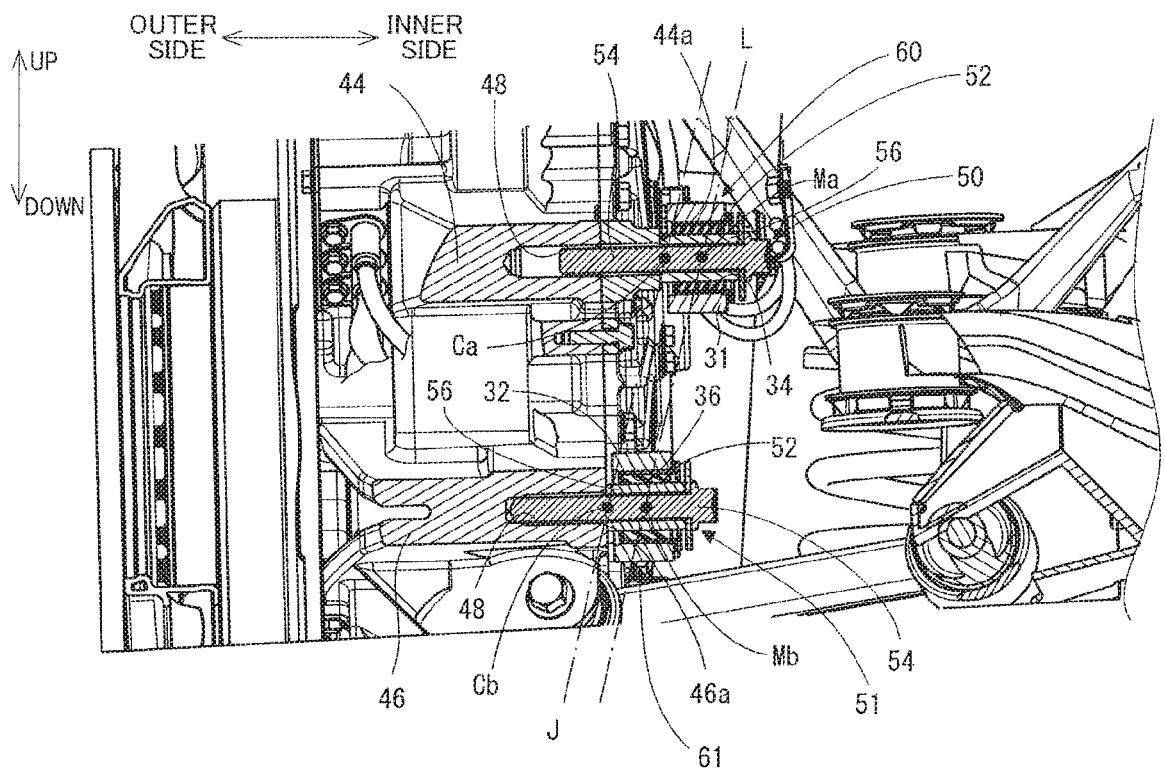
FIG. 4 is a partial cross-sectional view taken along line IV-IV in FIG. 3.

As illustrated in FIG. 4, a front end portion of the carrier 14 is provided with two holders 44, 46 spaced apart from each other in the up and down direction. Each of the holders 44, 46 extends in a direction substantially parallel with the rotation center axis A. A central portion of each of the holders 44, 46 has a female threaded hole 48 extending in the direction substantially parallel with the rotation center axis A. The female threaded hole 48 of each of the holders 44, 46 opens toward the inner side in the vehicle.

As illustrated in FIG. 4, the holder 44 is located above the holder 46. An end face 44a of the upper holder 44 is located on an inner side of an end face 46a of the lower holder 46 in the widthwise direction of the vehicle. A center point Ca is a central point of an open end of the female threaded hole 48 in its radial direction and is a point located in the end face 44a of the holder 44. A center point Cb is a central point of an open end of the female threaded hole 48 in its radial direction and is a point located in the end face 46a of the holder 46. A straight line J extending through the center points Ca, Cb extends in a direction directed upward and inward in the widthwise direction of the vehicle. It is noted that each of the end faces 44a, 46a has an opening of the female threaded hole 48. Thus, the point in the end face is set in the opening in some cases. As will be described below, however, a fastener 54 is provided in the female threaded hole 48 in a state in which the trailing arm 20 is coupled to the carrier 14. Thus, it is possible to consider that the point in the opening is set in the fastener 54. It is possible to consider that the widthwise direction of the vehicle coincides with a direction substantially parallel with the rotation center axis A in the case where the vehicle is traveling straight. Thus, the widthwise direction of the vehicle is set to coincide with the direction substantially parallel with the rotation center axis A in the present specification.

The one end portion 31 of the trailing arm 20 and the holder 44 of the carrier 14 are pivotably coupled to each other by a coupling device 50. The one end portion 32 of the trailing arm 20 and the holder 46 of the carrier 14 are pivotably coupled to each other by a coupling device 51. Each of the coupling devices 50, 51 includes a rubber bushing 52, a bolt 54 as one example of a fastener, and a spacer 56. The bushing 52 has a substantially cylindrical shape, and the spacer 56 having a cylindrical shape is fittable in the inner circumferential side of the bushing 52.

The trailing arm 20 has through holes 34, 36, each of which may be referred to as "bushing fitting hole". The bushing 52 is fitted in each of the through holes 34, 36, and the spacer 56 is fitted in the inner circumferential side of the bushing 52. The one end portions 31, 32 of the trailing arm 20 face the end faces 44a, 46a of the respective holders 44, 46 (each of which is located around the opening of the female threaded hole 48). In this state, the bolt 54 extends through the spacer 56 (the bushing 52) in the direction substantially parallel with the rotation center axis A so as to be engaged with the female threaded hole 48. Thus, the trailing arm 20 is pivotably coupled to the carrier 14. In the present embodiment, coupling portions 60, 61 are constituted by the respective coupling devices 50, 51, the respective holders 44, 46 of the carrier 14, and the respective one end portions 31, 32 of the trailing arm 20, for example.

In the state in which the trailing arm 20 is coupled to the carrier 14, the one end portions 31, 32 of the trailing arm 20 in one case are in direct contact with the end faces 44a, 46a of the respective holders 44, 46 of the carrier 14, and the one end portions 31, 32 of the trailing arm 20 in the other case are in indirect contact with the end faces 44a, 46a of the respective holders 44, 46 via elements of the respective coupling devices 50, 51, such as the bushings 52 or the spacers 56. In any case, a surface at which the one end portions 31, 32 of the trailing arm 20 and the respective holders 44, 46 of the carrier 14 are opposed to each other (e.g., at least one of (i) surfaces of the one end portions 31, 32 of the trailing arm 20 which face the respective end faces 44a, 46a and (ii) the end faces 44a, 46a) is referred to as "coupling surface".

As illustrated in FIG. 4, in the state in which the trailing arm 20 is coupled to the carrier 14, a point Ma on the bolt 54 which corresponds to a center point of the bushing 52 in a direction parallel with the rotation center axis A as a reference point of the upper coupling portion 60 is located on an inner side of a reference point Mb of the lower coupling portion 61 in the widthwise direction of the vehicle. Thus, a straight line L extending through the reference points Ma, Mb of the respective coupling portions 60, 61 extends upward and inward in the widthwise direction of the vehicle.

Figure 7:
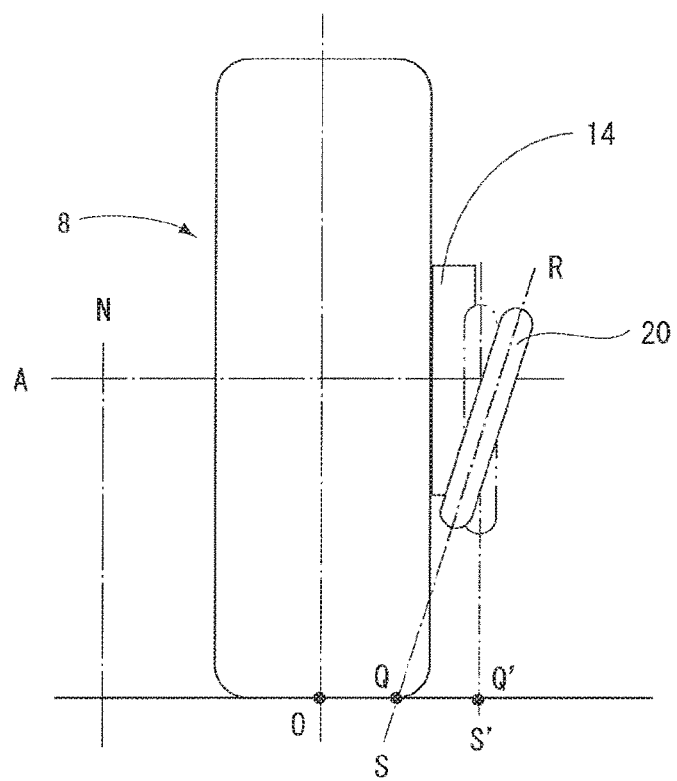
FIG. 7 is a front elevational view (a conceptual view) of the vehicle.

In the state in which the trailing arm 20 is coupled to the carrier 14, as illustrated in FIG. 7, portions of the trailing arm 20 which are located near at least the one end portions 31, 32 are positioned such that the straight line S including the principal axis R extends upward and inward in the widthwise direction of the vehicle. The straight line S coincides with or does not coincide with the straight line L. Even in the case where the straight line S does not coincide with the straight line L, the straight line S passes through a position near the straight line L.

It is not essential that the principal axis of the cross section of the trailing arm 20 which is parallel with the rotation center axis A extends upward and inward in the widthwise direction of the vehicle as described above. A principal axis of a cross section of at least any portion of the trailing arm 20 at least needs to extend upward and inward in the widthwise direction of the vehicle.

A reaction force against a force in the front and rear direction which is an output of the in-wheel motor 12 is received by the trailing arm 20 and the carrier 14. Thus, a moment about a point of intersection P between the road surface and the straight line L extending through the reference points Ma, Mb of the respective coupling portions 60, 61 is applied to the rear wheel 8 by the output of the in-wheel motor 12. As illustrated in FIG. 1B, the point of intersection P is nearer to a contact center point O of the rear wheel 8 than a point of intersection P' between a straight line L' and the road surface in the case where the reference points of the respective coupling portions are located on a plane N orthogonal to the rotation center axis A ($_{no}t_e$d that this case may be referred to as a case where the reference points are located at the same position in the widthwise direction of the vehicle). The plane N may be hereinafter referred to as "orthogonal plane N". That is, the distance d between the contact center point O and the point of intersection P is less than the distance d' between the contact center point O and the point of intersection P'. With this configuration, the moment generated about the point of intersection P by the output of the in-wheel motor 12 is less than a moment generated about the point of intersection P'.

Figure 6:
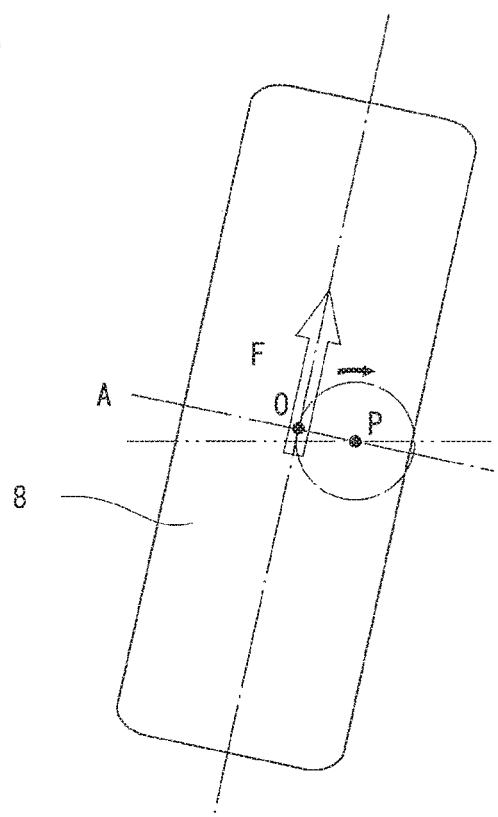
FIG. 6 is a view illustrating a state of a toe change of the wheel.

In the vehicle including the suspension apparatus 10 configured as described above, as illustrated in FIG. 6, in the case where the output of the in-wheel motor 12 (a driving force or a regenerative braking force) has increased, the moment about the point of intersection P causes the rear wheel 8 to face in a toe-in direction or a toe-out direction. That is, rotation of the carrier 14 relative to the trailing arm 20 is allowed by a twist of the bushing 52. In this case, a moment causing the rear wheel 8 to face in the toe-in direction or the toe-out direction and generated due to increase in the output of the in-wheel motor 12 decreases. This reduces a toe change of the rear wheel 8, thereby improving the stability during acceleration and deceleration of the vehicle.

It is also possible to reduce a bending force applied to the trailing arm 20, thereby reducing a load in a bending direction which is applied to the trailing arm 20. This reduces the thickness and the weight of the trailing arm 20.

A force applied to the coupling surface at which the trailing arm 20 and the carrier 14 are coupled to each other and a force applied to the bolt 54 can be brought closer to a force in a shearing direction. In other words, it is possible to reduce a bending force applied to the coupling surface and the bolt 54. This reduces lowering of the strength of coupling between the trailing arm 20 and the carrier 14, thereby reducing the size of each of the coupling devices 50, 51 (e.g., the size of the bolt 54) and costs.

It is not essential that each of the coupling devices 50, 51 includes the bushing 52, and each of the coupling devices 50, 51 may include a ball joint. The trailing arm 20 may be coupled to the carrier 14 by the bolt 54 not via the bushing 52.

Even in the case where the trailing arm 20 is coupled to the carrier 14 by the bolt 54 not via the bushing 52, the trailing arm 20 can be coupled to the carrier 14 in the state in which the straight line S including the principal axis R of the cross section of the trailing arm 20 extends upward and inward in the widthwise direction of the vehicle as illustrated in FIG. 7. In the present embodiment, the point of intersection Q between the straight line S and the road surface is located nearer to the contact center point O than the point of intersection Q' between the straight line S' and the road surface in the case where the principal axis is located in the orthogonal plane N, thereby reducing a moment applied to the trailing arm 20 due to the output of the in-wheel motor 12. As a result, it is possible to reduce a bending force applied to the trailing arm 20 in the thickness direction, thereby reducing a bending load on the trailing arm 20.

Figure 8:
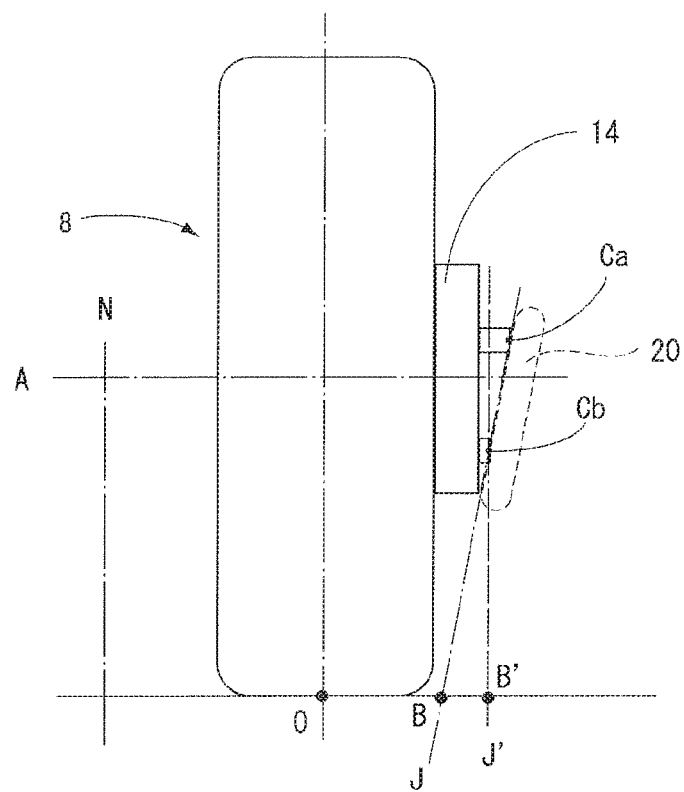
FIG. 8 is a front elevational view (a conceptual view) of the vehicle.

In the case where the trailing arm 20 is coupled to the carrier 14 by the bolt 54 not via the bushing 52, points in the coupling surfaces of the respective coupling portions 60, 61 may be set as the reference points, for example. For example, the center points Ca, Cb each located in the bolt 54 and corresponding to the central point of the opening of the female threaded hole 48 in its radial direction in the corresponding one of the end faces 44a, 46a of the respective holders 44, 46 may be set as the reference points as described above. The trailing arm 20 may be coupled to the carrier 14 in the state in which the straight line J extending through the reference points Ca, Cb of the respective coupling portions 60, 61 extends upward and inward in the widthwise direction of the vehicle. In the present embodiment, as illustrated in FIG. 8, a point of intersection B between the straight line J and the road surface is nearer to the contact center point O than a point of intersection B' between a straight line J' and the road surface in the case where reference points of a plurality of coupling portions are located in the orthogonal plane N. This configuration reduces a bending force applied to the bolt 54 and the coupling surface at which the trailing arm 20 and the carrier 14 are coupled to each other, and generated due to a moment caused by the output of the in-wheel motor 12, thereby reducing lowering of the coupling strength, for example.

Thus, the reference points of the respective coupling portions 60, 61 are not limited to the reference points Ma, Mb and may be set to the reference points Ca, Cb, for example.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, a type of the suspension to which the present disclosure is applied is not limited and at least needs to be a suspension including a suspension member extending in the front and rear direction.

CLAIMABLE INVENTIONS

There will be described claimable inventions.

(1) A suspension apparatus configured to support a wheel of a vehicle comprising an in-wheel motor,
wherein the suspension apparatus comprises a suspension member extending substantially in a front and rear direction of the vehicle and coupled to a carrier at a plurality of coupling portions spaced apart from each other in an up and down direction, the carrier holding the in-wheel motor, and
wherein a reference point of an upper one of the plurality of coupling portions is located on an inner side of a reference point of a lower one of the plurality of coupling portions in a widthwise direction of the vehicle.

One end portion of the suspension member is coupled to the carrier at the plurality of coupling portions. The other end portion of the suspension member is coupled to a vehicle-body-side component. The suspension member is coupled at its one end portion to the carrier at two or more coupling portions in some case or at three or more coupling portions in another case, for example.

(2) The suspension apparatus according to the above form (1), wherein the suspension member is coupled to the carrier in a state in which a straight line extending through a principal axis of a cross section of the suspension member extends upward and inward in the widthwise direction of the vehicle.

The straight line extending through the principal axis of the suspension member coincides with or does not coincide with a straight line extending through the reference points of the respective coupling portions. Even in the case where the straight line extending through the principal axis does not coincide with the straight line extending through the reference points of the respective coupling portions, the straight line extending through the principal axis is located near the straight line extending through the reference points of the respective coupling portions. The cross section of the suspension member may be a cross section in a direction parallel with a rotation center axis of the output shaft of the in-wheel motor, for example.

(3) The suspension apparatus according to the above form (1) or (2),
wherein the plurality of coupling portions respectively comprise a plurality of holders provided on the carrier, and
wherein an end face of an upper one of the plurality of holders is located on an inner side of an end face of a lower one of the plurality of holders in the widthwise direction of the vehicle.

An inner face of the holder in the widthwise direction of the vehicle may be set as the end face, for example. In most cases, the end face extends parallel with an orthogonal plane that is orthogonal to the rotation center axis. The reference point of the coupling portion may be set at a point in the end face of the holder.

(4) The suspension apparatus according to any one of the above forms (1) through (3),
wherein the plurality of coupling portions respectively comprise a plurality of coupling devices configured to couple the carrier and the suspension member,
wherein each of the plurality of coupling devices comprises a rubber bushing and a fastener, and
wherein the reference point of each of the plurality of coupling portions is a point in the coupling device.

In the suspension apparatus according to this form, the reference point may be provided at a portion, at which the suspension member and the carrier are coupled to each other, via the rubber bushing provided in the coupling device. The coupling portion may include a portion having a through hole in which the holder, the coupling device, and a rubber bushing provided on the suspension member are fittable.

(5) The suspension apparatus according to any one of the above forms (1) through (4),
wherein the reference point of each of the plurality of coupling portions is a predetermined point in a coupling surface at which the suspension member and the carrier are coupled to each other, and
wherein the suspension member is coupled to the carrier in a state in which a straight line extending through the reference point of each of the plurality of coupling portions in the coupling surface extends upward and inward in the widthwise direction of the vehicle.

(6) The suspension apparatus according to any one of the above forms (1) through (5), wherein the suspension member is configured to receive a force applied to the wheel in the front and rear direction.

(7) The suspension apparatus according to any one of the above forms (1) through (6), wherein the suspension member is a trailing arm.

(8) The suspension apparatus according to any one of the above forms (1) through (7),
wherein the suspension member is a first suspension member extending substantially in the front and rear direction of the vehicle,
wherein the suspension apparatus comprises a plurality of suspension members comprising the first suspension member, and
wherein at least one suspension member different from the first suspension member among the plurality of suspension members is a second suspension member extending substantially in the widthwise direction of the vehicle.

(9) The suspension apparatus according to any one of the above forms (1) through (8), wherein the wheel is a rear wheel of the vehicle.

(10) A suspension apparatus configured to support a wheel of a vehicle comprising an in-wheel motor,
wherein the suspension apparatus comprises a suspension member extending substantially in a front and rear direction of the vehicle and coupled to a carrier, and
wherein the suspension member is coupled to the carrier in a state in which a straight line extending through a principal axis of a cross section of the suspension member extends upward and inward in a widthwise direction of the vehicle.

The cross section of the suspension member may be a cross section in a direction parallel with a rotation center axis of an output shaft of the in-wheel motor, for example. The suspension apparatus according to this form may incorporate the technical feature according to any one of the above forms (1) through (9).

(11) A suspension apparatus configured to support a wheel of a vehicle comprising an in-wheel motor,
wherein the suspension apparatus comprises a suspension member extending substantially in a front and rear direction of the vehicle and coupled to a carrier at a plurality of coupling portions spaced apart from each other in an up and down direction, the carrier holding the in-wheel motor, and
wherein the suspension member is coupled to the carrier in a state in which a straight line extending through a reference point of each of the plurality of coupling portions in a coupling surface at which the suspension member and the carrier are coupled to each other extends upward and inward in a widthwise direction of the vehicle.

The suspension apparatus according to this form may incorporate the technical feature according to any one of the above forms (1) through (10).

(12) The suspension apparatus according to the above form (10) or (11), wherein each of the plurality of coupling portions comprises the holder, a fastener, and a portion of the suspension member which comprises a through hole through which the fastener is capable of coming.

(13) A vehicle, comprising:
a wheel comprising an in-wheel motor;
a suspension apparatus configured to support the wheel,
wherein the suspension apparatus comprises a suspension member extending substantially in a front and rear direction of the vehicle and configured to support a carrier at a plurality of coupling portions spaced apart from each other in an up and down direction, the carrier holding the in-wheel motor, and
wherein a reference point of an upper one of the plurality of coupling portions is located on an inner side of a reference point of a lower one of the plurality of coupling portions in a widthwise direction of the vehicle.

The suspension apparatus of the vehicle according to this form may be the suspension apparatus according to any one of the above forms (1) through (12).

What is claimed is:
1. A suspension apparatus configured to support a wheel of a vehicle comprising an in-wheel motor,
wherein the suspension apparatus comprises a trailing arm extending substantially in a front and rear direction of the vehicle and coupled to a front end portion of a carrier at a plurality of coupling portions spaced apart from each other in an up and down direction, the carrier holding the in-wheel motor, wherein a reference point of an upper one of the plurality of coupling portions is located on an inner side of a reference point of a lower one of the plurality of coupling portions in a widthwise direction of the vehicle, and wherein the trailing arm is coupled to the carrier in a state in which a straight line extending through a principal axis of a cross section of the trailing arm extends upward and inward in the widthwise direction of the vehicle and coincides with a reference line extending through the reference point of the upper one of the plurality of coupling portions and the reference point of the lower one of the plurality of coupling portions.

2. The suspension apparatus according to claim 1, wherein the plurality of coupling portions respectively comprise a plurality of holders provided on the carrier, and wherein an end face of an upper one of the plurality of holders is located on an inner side of an end face of a lower one of the plurality of holders in the widthwise direction of the vehicle.

3. The suspension apparatus according to claim 1, wherein the plurality of coupling portions respectively comprise a plurality of coupling devices configured to couple the carrier and the trailing arm to each other, wherein each of the plurality of coupling devices comprises a rubber bushing and a fastener, and wherein the reference point of each of the plurality of coupling portions is a point in the coupling device.

4. The suspension apparatus according to claim 1, wherein the reference point of each of the plurality of coupling portions is a predetermined point in a coupling surface at which the trailing arm and the carrier are coupled to each other, and wherein the trailing arm is coupled to the carrier in a state in which a straight line extending through the reference point of each of the plurality of coupling portions in the coupling surface extends upward and inward in the widthwise direction of the vehicle.

5. The suspension apparatus according to claim 1, wherein the trailing arm is configured to receive a force applied to the wheel in the front and rear direction.

6. The suspension apparatus according to claim 1, wherein the suspension apparatus comprises a plurality of suspension members comprising the trailing arm, and wherein at least one suspension member different from the trailing arm among the plurality of suspension members extends substantially in the widthwise direction of the vehicle.

7. A suspension apparatus configured to support a wheel of a vehicle comprising an in-wheel motor, wherein the suspension apparatus comprises a trailing arm member extending substantially in a front and rear direction of the vehicle and coupled to a front end portion of a carrier at a plurality of coupling portions spaced apart from each other in an up and down direction, the carrier holding the in-wheel motor, and wherein the trailing arm is coupled to the carrier in a state in which a reference line extending through a predetermined reference point of each of the plurality of coupling portions in a coupling surface at which the trailing arm and the carrier are coupled to each other extends upward and inward in a widthwise direction of the vehicle, and a straight line extending through a principal axis of a cross section of the trailing arm extends upward and inward in the widthwise direction of the vehicle and coincides with the reference line.

8. A vehicle, comprising:

a wheel comprising an in-wheel motor;

a suspension apparatus configured to support the wheel, wherein the suspension apparatus comprises a trailing arm extending substantially in a front and rear direction of the vehicle and configured to support a carrier at a front end portion of the carrier at a plurality of coupling portions spaced apart from each other in an up and down direction, the carrier holding the in-wheel motor, wherein a reference point of an upper one of the plurality of coupling portions is located on an inner side of a reference point of a lower one of the plurality of coupling portions in a widthwise direction of the vehicle, and wherein the trailing arm is coupled to the carrier in a state in which a straight line extending through a principal axis of a cross section of the trailing arm extends upward and inward in the widthwise direction of the vehicle and coincides with a reference line extending through the reference point of the upper one of the plurality of coupling portions and the reference point of the lower one of the plurality of coupling portions.

* * * * *